US008774732B2

(12) United States Patent
Kobayakawa

(10) Patent No.: US 8,774,732 B2
(45) Date of Patent: Jul. 8, 2014

(54) WIRELESS DEVICE, WIRELESS COMMUNICATION SYSTEM, AND WIRELESS COMMUNICATION METHOD

(75) Inventor: Shuji Kobayakawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 461 days.

(21) Appl. No.: 12/840,358

(22) Filed: Jul. 21, 2010

(65) Prior Publication Data

US 2011/0053494 A1 Mar. 3, 2011

(30) Foreign Application Priority Data

Sep. 3, 2009 (JP) ................................. 2009-204078

(51) Int. Cl.
*H04B 7/00* (2006.01)
(52) U.S. Cl.
USPC ......... 455/70; 455/556.1; 455/411; 455/41.2; 455/323; 455/445; 455/517; 455/422.1; 370/319; 370/328; 370/335; 370/315; 370/352
(58) Field of Classification Search
USPC ........... 455/70, 556.1, 411, 41.2, 323, 41, 25, 455/445, 517, 422.1; 370/319, 328, 335, 370/315, 352, 302, 360, 401, 402
See application file for complete search history.

(56) References Cited

U.S. PATENT DOCUMENTS

| 6,370,147 | B1 * | 4/2002 | Beser ............................ 370/401 |
| 6,512,926 | B1 * | 1/2003 | Henry-Labordere ......... 455/445 |
| 6,526,287 | B1 * | 2/2003 | Lee ............................. 455/556.1 |
| 6,766,160 | B1 * | 7/2004 | Lemilainen et al. .......... 455/411 |
| 7,974,227 | B1 * | 7/2011 | Seay ............................. 370/315 |
| 8,274,923 | B2 * | 9/2012 | Shen et al. ..................... 370/315 |
| 2002/0082035 | A1 | 6/2002 | Aihara et al. |
| 2003/0027525 | A1 * | 2/2003 | Moore et al. ..................... 455/41 |
| 2004/0048609 | A1 * | 3/2004 | Kosaka ....................... 455/422.1 |
| 2006/0126649 | A1 * | 6/2006 | Akiyoshi ....................... 370/401 |
| 2007/0058577 | A1 * | 3/2007 | Rubin ........................... 370/328 |
| 2008/0310339 | A1 * | 12/2008 | Kano ............................ 370/315 |
| 2009/0073969 | A1 * | 3/2009 | Gobara et al. ................. 370/389 |
| 2009/0168707 | A1 * | 7/2009 | Nakae et al. .................. 370/329 |
| 2011/0119458 | A1 * | 5/2011 | Matsuzaki et al. ............ 711/162 |

FOREIGN PATENT DOCUMENTS

| EP | 1 450 522 | 8/2004 |
| EP | 1 701 486 | 9/2006 |
| JP | 10-227400 | 8/1998 |

(Continued)

OTHER PUBLICATIONS

European Search Report dated Dec. 22, 2010, from the corresponding European Application.

(Continued)

*Primary Examiner* — Ganiyu A Hanidu
(74) *Attorney, Agent, or Firm* — Katten Muchin Rosenman LLP

(57) ABSTRACT

A wireless device selects another wireless device that is the relay destination of data and transmits data to a data collector that collects data. Then, the wireless device transmits data obtained by adding relay-destination-device identification information of identifying the another wireless device that is a relay destination to the same as data transmitted to the data collector to the selected wireless device that is the relay destination of data. Moreover, the wireless device transmits the received data to the data collector when data obtained by adding relay-destination-device identification information is received from another wireless device and the device itself corresponds to the relay-destination-device identification information.

8 Claims, 11 Drawing Sheets

(56) References Cited

FOREIGN PATENT DOCUMENTS

| | | |
|---|---|---|
| JP | 2002-44003 | 2/2002 |
| JP | 2004-282266 | 10/2004 |
| JP | 2006-186565 | 7/2006 |
| JP | 2006-191514 | 7/2006 |
| JP | 2007-243794 | 9/2007 |
| WO | 95/11561 | 4/1995 |
| WO | 03/003672 | 1/2003 |
| WO | 2005/025147 | 3/2005 |
| WO | 2006054190 | 5/2006 |

OTHER PUBLICATIONS

Notice of Rejection dated Jun. 25, 2013, from corresponding Japanese Application No. 2009-204078.

* cited by examiner

WIRELESS DEVICE, WIRELESS COMMUNICATION SYSTEM, AND WIRELESS COMMUNICATION METHOD

CROSS-REFERENCE TO RELATED APPLICATION

This application is based upon and claims the benefit of priority of the prior Japanese Patent Application No. 2009-204078, filed on Sep. 3, 2009, the entire contents of which are incorporated herein by reference.

FIELD

The embodiments discussed herein are directed to a wireless device, a wireless communication system, and a wireless communication method.

BACKGROUND

In recent years, a research for a wireless sensor network through which data collected for various applications are wirelessly transmitted to a high-order network has been performed by using a wireless device in which a small-sized wireless module is mounted on a sensor. It is assumed that the wireless sensor network is used in various scenes such as a medical front, a farm, or a town. As an example of a wireless device, there is a sensor node in which a sensor collects information such as an object, a person, or an environment and a wireless module wirelessly transmits data.

Now, it will be explained about an application example of a wireless sensor network with reference to FIG. 15. FIG. 15 is a diagram explaining an application example of a wireless sensor network. In FIG. 15, it will be explained about the case where a wireless sensor network is applied to a medical front.

For example, as illustrated in FIG. 15, the wireless sensor network includes a plurality of sensor nodes that includes a wireless module and a sensor that are integrated and a coordinator that aggregates sensing data transmitted from the sensor node. As an example of a wireless communication technology using a sensor node, there are PAN (Personal Area Network), BAN (Body Area Network), and the like (hereinafter, "PAN/BAN").

In the PAN/BAN, there are, for example, an environmental sensor node that senses a temperature, a humidity, or an illuminance of surrounding environment, a vital sensor node that senses a temperature, a blood pressure, or a pulsebeat of a person, and the like. Moreover, a sensor node includes a node that is located on a human body and a node that is located within a range of a communication area that is about 10 meters around the human body, in the medical front.

On the other hand, a coordinator transmits data aggregated from each sensor node to a plurality of sensor nodes or AP (Access Point) that is located in a communication area. Moreover, the AP that receives data from the coordinator transmits the received data to a high-order network. At this time, the AP performs beam forming for transferring a radio wave to a specific communication area such as each sensor node or a coordinator in a focused way and performs wireless communication with each sensor node or a coordinator.

However, power delivery to the sensor node can use a built-in battery such as a button battery in some case assuming that the sensor node is used in the outdoors. Therefore, when a sensor node is used in the outdoors, it is particularly desirable that power consumption can be suppressed in terms of the lifetime of a battery. For this reason, for example, a sensor node for a wireless sensor network employs a protocol for making the node enter a sleep mode when the node is not used in many cases in order to last a battery for a long time by the suppression of power consumption.

On the other hand, the AP includes, for example, a plurality of array antenna, and controls an amplitude, a phase, or the like that acts as an array weight of each array antenna at the time of transmission and reception of a signal to turn the direction of beam of antenna to an arbitrary sensor node that is a communication target. Moreover, the AP performs null steering for turning low-level directivity to an interference source in the communication with an arbitrary sensor node. In this way, the AP raises the transmission quality of a signal that is transmitted and received.

When each sensor node transmits a signal, the wireless sensor network system can suppress power consumption of each sensor node in accordance with a gain improvement effect of a wireless communication path of the AP and each sensor node when beam directivity of AP is performed. The technology has been known as disclosed in, for example, Japanese Laid-open Patent Publication No. 2006-191514.

However, there is a problem in that the reliability in communication cannot be secured in the above conventional art.

As a specific example, it is assumed that a transmission range is about ten meters in short-distance wireless communication such as PAN/BAN. Moreover, the connection to a different external network such as a wireless LAN (Local Area Network) is performed within ten meters in a communication method used in PAN/BAN.

As described above, AP that connects a wireless device and an external network improves communication quality with the wireless device that is a communication target in accordance with the improvement of gain by the control of a communication path using the beam directivity of an array antenna. However, when an obstacle that blocks a communication path of a radio wave enters between the wireless device that is a communication target and the AP, the wraparound of a radio wave becomes weak by narrowing a beam and a communication cutoff can be performed by degrading a communication state.

As illustrated in FIG. 16, to avoid a communication cutoff caused by a factor such as an obstacle that blocks a communication path, it is conceivable that direct communication between a wireless device X and AP is changed to communication performed by a reflected wave, by a wall, of a signal transmitted from the wireless device X, for example. At this time, the AP has beam directivity to a reflected wave formed by a wall. FIG. 16 is a diagram illustrating an example of avoiding a communication cutoff caused by a factor such as an obstacle that blocks a communication path.

However, communication by a reflected wave formed by a wall and the like is unstable compared to direct communication between a wireless device and AP and is communication having low reliability in which a signal is degraded to some extent. Moreover, in outdoor wireless communication, it is difficult that a suitable reflected wave is always obtained from a wireless device that is not fixed and another communication path for avoiding a communication cutoff cannot be secured in some cases.

Furthermore, when using a wireless device in a medical front or the like, it is preferable that an instant communication cutoff for path switching is also avoided. As a result, the above conventional art cannot secure communication reliability.

SUMMARY

According to an aspect of an embodiment of the invention, a wireless communication system includes a first wireless device; a second wireless device; and a data collector. The first wireless device includes a relay destination selecting unit that selects the second wireless device as a relay destination of data; and a data transmitting unit that transmits first data to the data collector and transmits second data to the second wireless device, the second data containing the first data and relay-destination-device identification information for identifying the second wireless device. The second wireless device includes a data relaying unit that receives the second data from the first wireless device and transmits the second data to the data collector when the relay-destination-device identification information indicates the second wireless device. The data collector includes a data receiving unit that receives the first data transmitted from the first wireless device and the second data transmitted from the second wireless device.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENT

Preferred embodiments of the present invention will be explained with reference to accompanying drawings. The present invention is not limited to the embodiments explained below.

[a] First Embodiment

Figure 1:
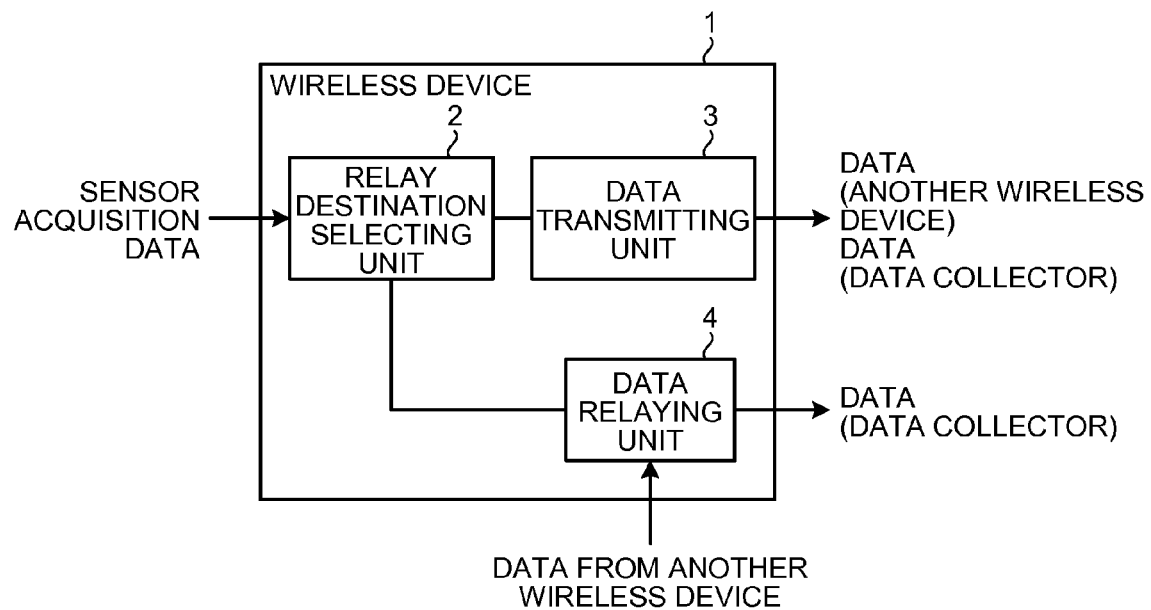
FIG. 1 is a diagram illustrating an example configuration of a wireless device according to a first embodiment.

First, it will be explained about an example configuration of a wireless device according to the first embodiment with reference to FIG. 1. FIG. 1 is a diagram illustrating an example configuration of a wireless device 1 according to the first embodiment.

For example, as illustrated in FIG. 1, the wireless device 1 includes a relay destination selecting unit 2, a data transmitting unit 3, and a data relaying unit 4. For example, the wireless device 1 transmits and receives data to and from another wireless device or a data collector, which acts as AP (Access Point) and collects data, by using short-distance wireless communication such as ZigBee (registered trademark) or Bluetooth (registered trademark).

Data that is transmitted and received between devices is, for example, is sensing data that is obtained from a person, an object, or an environment and is input into the wireless device 1 by a sensor that is a measuring device. As an example of a short-distance wireless communication network by the wireless device 1, there is PAN (Personal Area Network), BAN (Body Area Network), or the like.

According to the configuration, when data acquired by the sensor is transmitted to the other wireless device or the data collector, the relay destination selecting unit 2 selects a wireless device that is the relay destination of the data. Then, the data transmitting unit 3 transmits the data to, for example, the data collector that collects data.

Moreover, the data transmitting unit 3 adds relay-destination-device identification information of identifying a wireless device that is a relay destination to the same as data transmitted to the data collector and transmits the added data to the wireless device that is selected by the relay destination selecting unit 2. In this case, relay-destination-device identification information means identification information corresponding to a wireless device, which is the relay destination of the wireless device 1, among identification information different for each wireless device that is previously decided to identify each wireless device. In detail, identification information is, for example, an address that is previously assigned to a device such as a wireless device.

On the other hand, the data relaying unit 4 receives, for example, the data obtained by adding the relay-destination-device identification information from the other wireless device, and transmits the received data to the data collector when the device itself corresponds to the relay-destination-device identification information. The data collector receives the data transmitted from a plurality of wireless devices, and then performs the selection of data output from a wireless device having high radio field intensity or the synthesis process of the received data and transmits the data to a predetermined external network.

In other words, the wireless device transmits data to the data collector and transmits the same data to the other wireless device. Moreover, when receiving data from the other wireless device, the wireless device transmits the received data to the data collector. As a result, because the wireless device transmits the same data to the data collector via a plurality of routes without degrading communication quality, communication reliability can be secured compared with a conventional art that uses a reflected wave of avoiding an obstacle on a communication path.

[b] Second Embodiment

Network Configuration by Second Embodiment

Figure 2:
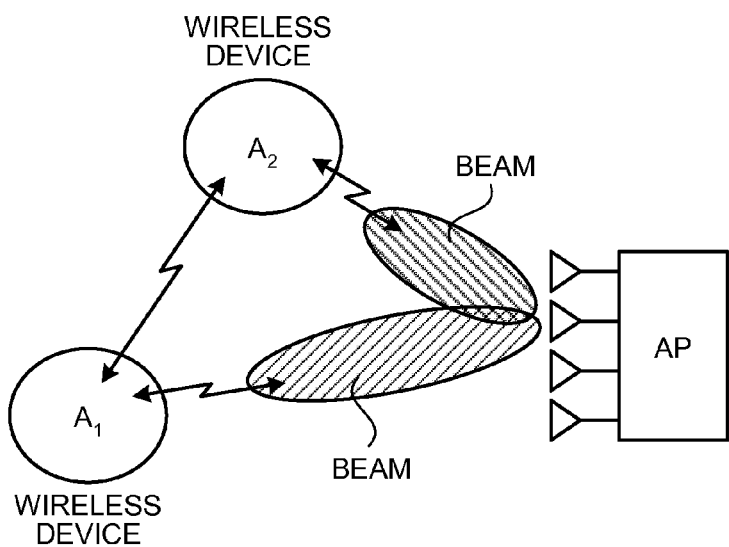
FIG. 2 is a diagram illustrating a network configuration example including a wireless device according to a second embodiment.
Figure 15:
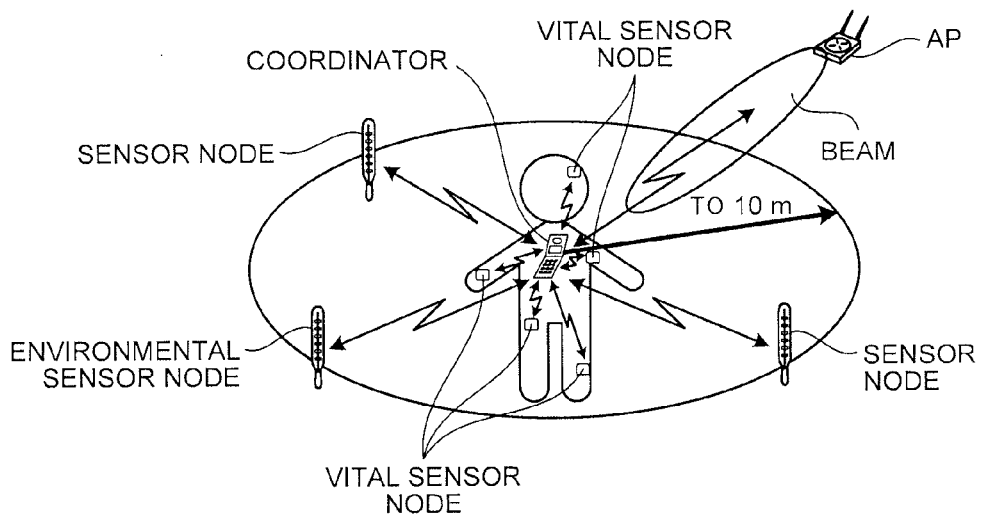
FIG. 15 is a diagram explaining an application example of a wireless sensor network.
Figure 16:
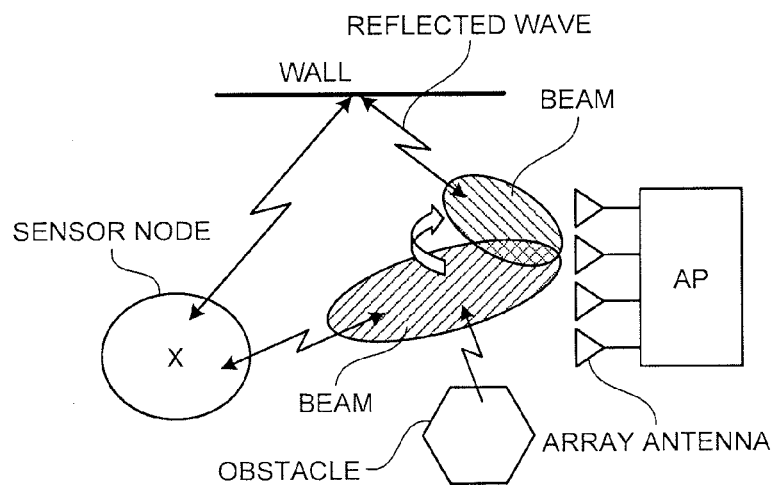
FIG. 16 is a diagram illustrating an example of avoiding a communication cutoff caused by a factor such as an obstacle that blocks a communication path.

Next, it will be explained about a network configuration example including a wireless device according to the second embodiment with reference to FIG. 2. FIG. 2 is a diagram illustrating a network configuration example including a wireless device according to the second embodiment. In this case, the wireless device is, for example, used in various scenes such as a medical front (see FIG. 15), a farm, or a town by using a network technique such as PAN and BAN.

For example, as illustrated in FIG. 2, the network including a wireless device includes a wireless device $A_1$, a wireless device $A_2$, and a data collector that functions as AP. The wireless device $A_1$ and the wireless device $A_2$ can wirelessly communicate with, for example, AP and can wirelessly communicate with each other in an ad-hoc communication method. On the other hand, the AP performs, for example, beam forming for turning the direction of the antenna to an arbitrary communication area and communicates with the wireless device $A_1$ and the wireless device $A_2$. Hereinafter, it will be explained about an example of transmitting data from the wireless device $A_1$.

For example, when transmitting data acquired by the sensor, the wireless device $A_1$ selects the wireless device $A_2$ as a wireless device that is the relay destination of the data. A wireless device that is the relay destination of data is selected, for example, by using a beacon signal output from each wireless device and by searching wireless devices that have mutually high radio field intensity in the vicinity.

The wireless device $A_1$ transmits data to AP and transmits the same as data transmitted to AP to the wireless device $A_2$ selected as the relay destination of data. Moreover, when transmitting data to the wireless device $A_2$, the wireless device $A_1$ transmits data that is obtained by adding self-device identification information of identifying the wireless device $A_1$ and relay-destination-device identification information of identifying the wireless device $A_2$. In addition, the transmission of data performed by the wireless device $A_1$ is performed in a time sharing manner. For example, the wireless device $A_1$ transmits data to the wireless device $A_2$ at a certain timing and transmits data to AP at a timing different from the timing at which the data is transmitted to the wireless device $A_2$.

On the other hand, the wireless device $A_2$ receives the data obtained by adding the relay-destination-device identification information from the wireless device $A_1$, and transmits (relays) the received data to AP when the device itself corresponds to the relay-destination-device identification information. After that, the AP receives the data transmitted from the wireless device $A_1$ and the wireless device $A_2$, and then performs the selection of data output from a wireless device having high radio field intensity, the synthesis process of the received data, or the like and transmits the data to a predetermined external network.

As above, it has been explained about the case where two wireless devices of the wireless device $A_1$ and the wireless device $A_2$ transmit the same data to AP. However, the number of wireless devices is not limited to two. More wireless devices exist on a network and AP receives multiple-route data.

Configuration of Wireless Device by Second Embodiment

Figure 3:
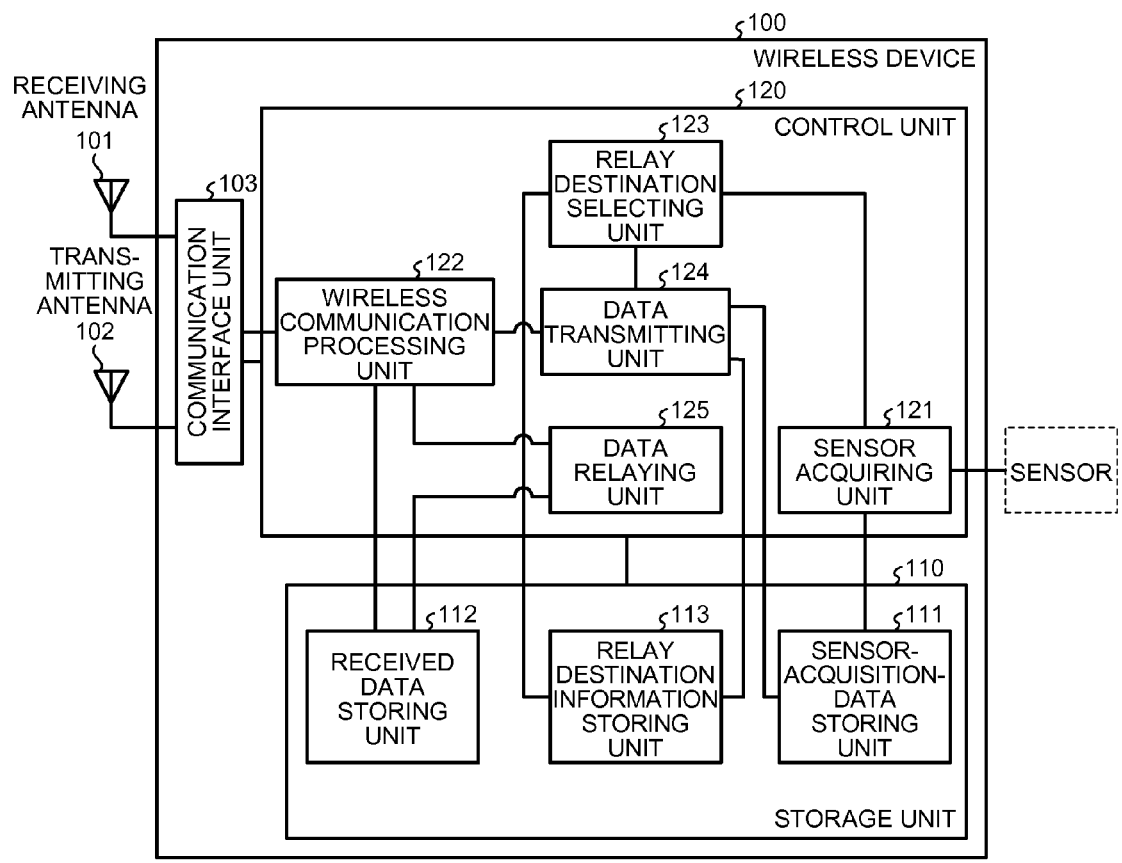
FIG. 3 is a diagram illustrating an example configuration of the wireless device according to the second embodiment.

Next, it will be explained about an example configuration of a wireless device according to the second embodiment with reference to FIG. 3. FIG. 3 is a diagram illustrating an example configuration of a wireless device 100 according to the second embodiment.

For example, as illustrated in FIG. 3, the wireless device 100 includes a receiving antenna 101, a transmitting antenna 102, a communication interface unit 103, a storage unit 110, and a control unit 120.

The receiving antenna 101 receives various types of information that are input into the wireless device 100. For example, the receiving antenna 101 receives data transmitted from another wireless device different from the wireless device 100 and inputs the data into the communication interface unit 103. The transmitting antenna 102 transmits various types of information that are output from the wireless device 100. For example, the transmitting antenna 102 transmits data to another wireless device different from the wireless device 100 or a data collector that collects data. For example, the communication interface unit 103 controls data transfer of various types of information that are transmitted to or received from the wireless device different from the wireless device 100 or the data collector via the receiving antenna 101 or the transmitting antenna 102.

The storage unit 110 stores data required for various types of processes performed by the control unit 120 and various types of processing results performed by the control unit 120. The storage unit 110 includes a sensor-acquisition-data storing unit 111, a received data storing unit 112, and a relay destination information storing unit 113. For example, the storage unit 110 is a semiconductor memory device such as RAM (Random Access Memory), ROM (Read Only Memory), or a flash memory, or is a storage device such as a hard disk or an optical disc.

The sensor-acquisition-data storing unit 111 stores, for example, data acquired by a sensor acquiring unit 121 to be described below. The data stored in the sensor-acquisition-data storing unit 111 is, for example, sensing data obtained from a person, an object, an environment, or the like and is data that is input into the wireless device 100 by a sensor.

The received data storing unit 112 stores, for example, data processed by a wireless communication processing unit 122 to be described below. The data stored in the received data storing unit 112 is, for example, data transmitted from another wireless device different from the wireless device 100 (for example, sensing data detected by a sensor in another wireless device). Moreover, the relay destination information storing unit 113 stores, for example, relay-destination-device identification information of identifying a wireless device that is the relay destination of data that is processed by a relay destination selecting unit 123 to be described below.

The control unit 120 includes an internal memory that stores a control program, a program that defines various types of processing procedures, and required data, and controls the wireless device 100. The control unit 120 further includes the sensor acquiring unit 121, the wireless communication processing unit 122, the relay destination selecting unit 123, a data transmitting unit 124, and a data relaying unit 125. In this case, the control unit 120 is, for example, an integrated circuit such as ASIC (Application Specific Integrated Circuit) or FPGA (Field Programmable Gate Array) or an electronic circuit such as CPU (Central Processing Unit) or MPU (Micro Processing Unit).

The sensor acquiring unit 121 acquires, for example, various types of data measured by the sensor and stores the acquired data in the sensor-acquisition-data storing unit 111. Moreover, when acquiring data, the sensor acquiring unit 121 informs the relay destination selecting unit 123 of the acquisition of data. It should be noted that the data measured by the sensor is, for example, sensing data that is obtained from a person, an object, an environment, or the like.

The wireless communication processing unit 122 makes, for example, the received data storing unit 112 store data that is transmitted from the other wireless device and is received by the receiving antenna 101 and informs the data relaying unit 125 of the reception of data. Moreover, the wireless communication processing unit 122 performs, for example, a control operation of transmitting the data received from the data transmitting unit 124 to the transmitting antenna 102 via the communication interface unit 103. Furthermore, the wireless communication processing unit 122 performs, for example, a control operation of transmitting the data received from the data relaying unit 125 to the transmitting antenna 102 via the communication interface unit 103.

The relay destination selecting unit 123 selects, for example, a wireless device that is the relay destination of data at a timing at which data is acquired by the sensor acquiring unit 121, at a predetermined timing, or the like. The wireless device that is the relay destination of data is selected, for example, by using a beacon signal output from each wireless device and by searching wireless devices of which the radio field intensities with the wireless device 100 are not less than a predetermined value. The number of the selected wireless devices that are a relay destination may be one or more if the radio field intensity with the wireless device 100 is not less than the predetermined value.

Then, the relay destination selecting unit 123 makes the relay destination information storing unit 113 store relay-destination-device identification information of identifying the selected wireless device that is a relay destination. After that, the relay destination selecting unit 123 informs the data transmitting unit 124 of the selection of the wireless device that is a relay destination. The relay destination selecting unit 123 is an example of the relay destination selecting unit 2.

The data transmitting unit 124 acquires data from the sensor-acquisition-data storing unit 111, for example, when data is acquired by the sensor acquiring unit 121 and then the selection of the wireless device that is a relay destination is informed by the relay destination selecting unit 123. Then, the data transmitting unit 124 transmits the acquired data to the data collector. Next, the data transmitting unit 124 acquires relay-destination-device identification information from the relay destination information storing unit 113. After that, the data transmitting unit 124 adds self-device identification information of identifying the wireless device 100 and the acquired relay-destination-device identification information to the data acquired from the sensor-acquisition-data storing unit 111, and transmits the added data to the wireless device that is a relay destination. It should be noted that the data transmitting unit 124 is an example of the data transmitting unit 3.

Figure 4:
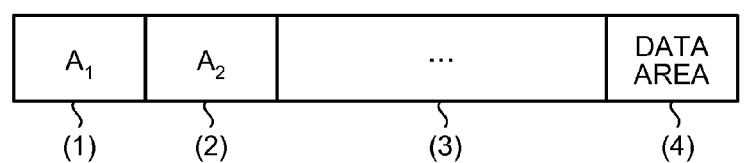
FIG. 4 is a diagram illustrating an example of data transmitted by a data transmitting unit to the wireless device that is a relay destination.

Now, it will be explained about data that is transmitted by the data transmitting unit 124 to the wireless device that is a relay destination. FIG. 4 is a diagram illustrating an example of data that is transmitted by the data transmitting unit 124 to the wireless device that is a relay destination.

As illustrated in FIG. 4, the data transmitted by the data transmitting unit 124 to the wireless device that is a relay destination has, for example, "A$_1$" (see (1) of FIG. 4) that is self-device identification information and "A$_2$" (see (2) of FIG. 4) that is relay-destination-device identification information. Additionally, the data transmitted by the data transmitting unit 124 to the wireless device that is a relay destination has a data area that is an area of data to be transmitted (see (4) of FIG. 4). Moreover, the area of (3) of FIG. 4 can be utilized as identification information or the empty space of the data area. Moreover, the transmission of data to the data collector and the other wireless device performed by the data transmitting unit 124 is performed in a time sharing manner. It should be noted that the received data storing unit 112 stores data similar to data illustrated in FIG. 4.

Returning to FIG. 3, the data relaying unit 125 acquires, for example, data from the received data storing unit 112 when it is notified that data is received by the wireless communication processing unit 122. Then, the data relaying unit 125 transmits the acquired data to the data collector when the wireless device 100 corresponds to the relay-destination-device identification information included in the data acquired from the received data storing unit 112. Moreover, when the wireless device 100 does not correspond to the relay-destination-device identification information included in the data acquired from the received data storing unit 112, the data relaying unit 125 does not transmit the acquired data and deletes the data from the received data storing unit 112.

In a data relay process performed by the data relaying unit 125, the data acquired from the received data storing unit 112 is transmitted to the data collector when the wireless device 100 corresponds to "A2" assuming that relay-destination-device identification information is A2. It should be noted that the data relaying unit 125 is an example of the data relaying unit 4.

Configuration of Data Collector

Figure 5:
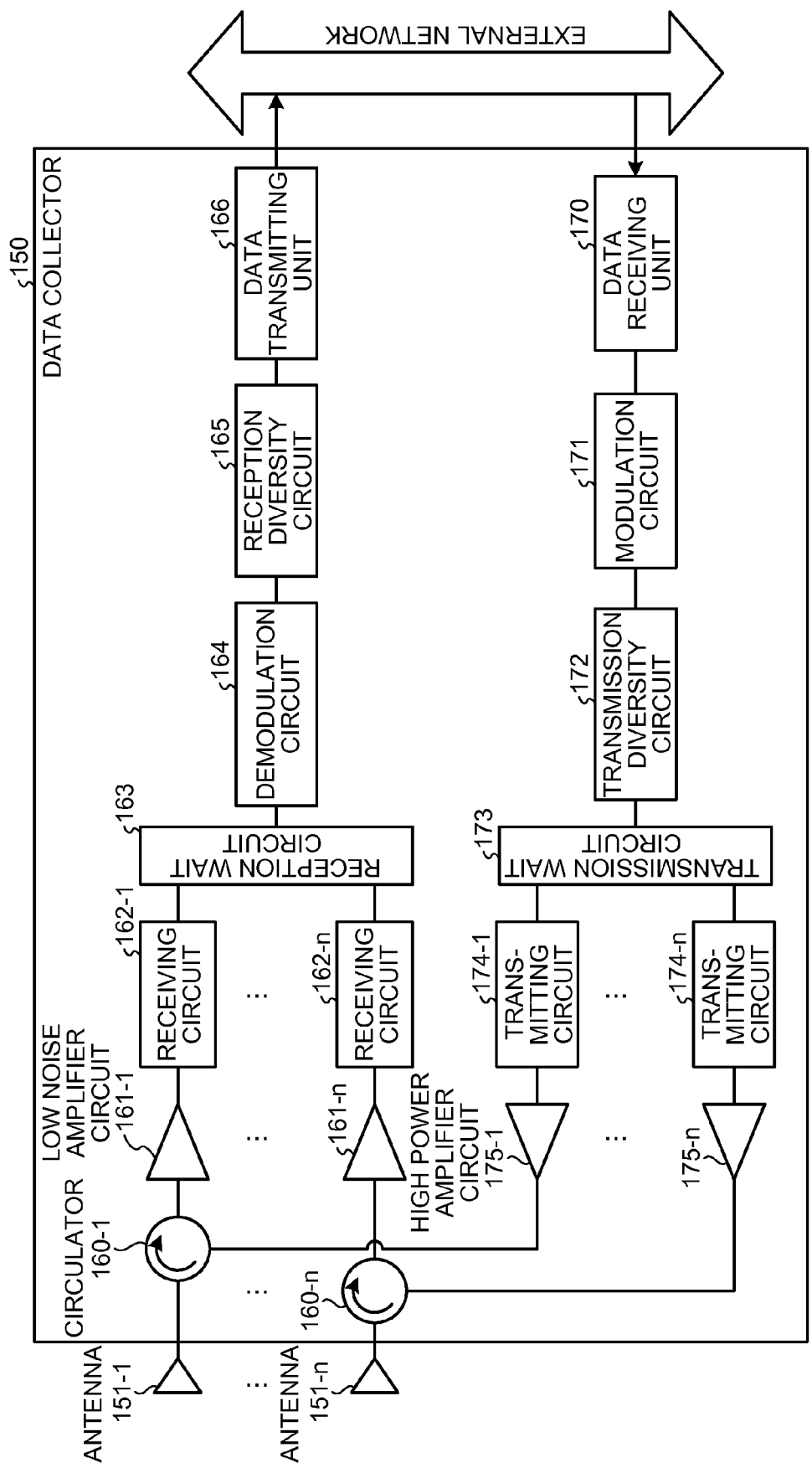
FIG. 5 is a diagram illustrating an example configuration of a data collector.

Next, it will be explained about an example configuration of a data collector with reference to FIG. 5. FIG. 5 is a diagram illustrating an example configuration of a data collector 150. The data collector means a device that functions as AP and collects data.

For example, as illustrated in FIG. 5, the data collector 150 includes antennas 151-1 to 151-$n$ (n is a natural number), circulators 160-1 to 160-$n$, low noise amplifier circuits 161-1 to 161-$n$, and receiving circuits 162-1 to 162-$n$. For example, the data collector 150 further includes a reception wait circuit 163, a demodulation circuit 164, a reception diversity circuit 165, and a data transmitting unit 166. Moreover, for example, the data collector 150 further includes a data receiving unit 170, a modulation circuit 171, a transmission diversity circuit 172, a transmission wait circuit 173, transmitting circuits 174-1 to 174-$n$, and high power amplifier circuits 175-1 to 175-$n$.

The antennas 151-1 to 151-$n$ are, for example, an array antenna that has beam directivity in the direction of an arbitrary wireless device while transmitting and receiving data to and from the arbitrary wireless device. Moreover, the circulators 160-1 to 160-$n$ have, for example, a plurality of ports and output data received by the antennas 151-1 to 151-$n$ to a receiving-system circuit. Moreover, the circulators 160-1 to 160-$n$ output, for example, data input from a transmitting-system circuit to the antennas 151-1 to 151-$n$.

Then, the data output by the circulators 160-1 to 160-$n$ to the receiving system is input into the reception wait circuit 163 via the low noise amplifier circuits (LNA) 161-1 to 161-$n$ and the receiving circuit (RX). The reception wait circuit 163 performs, for example, a wait control by using the phase or amplitude of received signals that are input, to control the direction of beam directivity for the wireless device. In addition, because a wait control method of an array antenna includes a well-known method such as a least mean square method of maximizing received SIR (Signal to Interference power Ratio), a beam selection method, and the like, its detailed description is omitted.

After that, the demodulation circuit 164 demodulates, for example, the received plurality of data. Then, the reception diversity circuit 165 summarizes, for example, a plurality of data demodulated by the demodulation circuit 164 for the same data and stores the summarized data in a predetermined memory as received data. In this case, the same data means identification information added at the time of data transmission by the wireless device 100, in other words, data of which the self-device identification information of wireless devices that are a transmission source are the same.

Next, the reception diversity circuit 165 uses, for example, the self-device identification information, and selects data output from the wireless device having high radio field intensity or synthesizes data for the received data summarized for the same data to perform a diversity process on data that is transmitted to the outside. In the diversity process, for example, only data output from the wireless device having high radio field intensity among the same data is preferentially used on the basis of RSS (Received Signal Strength) of a beacon signal. Moreover, in the diversity process, for example, data output from a plurality of wireless devices of which the radio field intensities are not less than a predetermined value are selected and synthesized among the same data. After that, the data transmitting unit 166 transmits, for example, data on which the diversity process is performed by the reception diversity circuit 165 to an external network.

The data receiving unit 170 receives, for example, data from the external network. Then, the modulation circuit 171 modulates, for example, the data received by the data receiving unit 170 and inputs the modulated data into the transmission diversity circuit 172. The transmission diversity circuit 172 generates, for example, transmission data that is output to a plurality of transmitting systems (antennas), contrary to the reception diversity circuit 165. Next, the transmission wait circuit 173 performs, for example, a wait control in a transmitting system by using the transmission data to control the direction of beam directivity for the wireless device. After that, the transmission data is transmitted from the antennas 151-1 to 151-$n$ via the transmitting circuits (TX) 174-1 to 174-$n$, the high power amplifier circuits (HPA) 175-1 to 175-$n$, and the circulators 160-1 to 160-$n$.

Data Transmission Process by Second Embodiment

Figure 6:
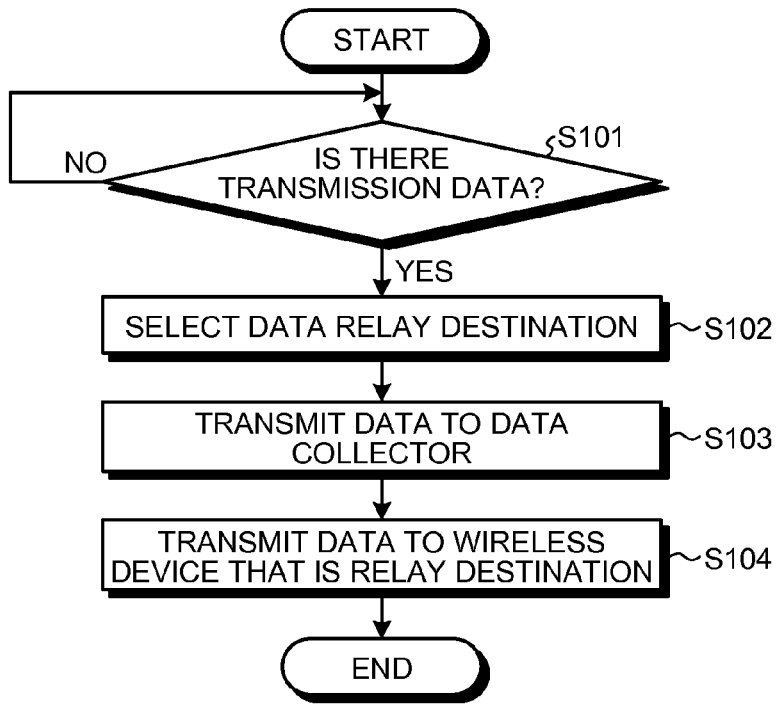
FIG. 6 is a flowchart explaining a flow of a data transmission process according to the second embodiment.

Next, it will be explained about the flow of a data transmission process according to the second embodiment with reference to FIG. 6. FIG. 6 is a flowchart explaining the flow of a data transmission process according to the second embodiment. It should be noted that a data transmission process mainly means a process performed by the relay destination selecting unit 123 and the data transmitting unit 124.

For example, as illustrated in FIG. 6, when there is transmission data in accordance with the acquisition notice of the sensing data from the sensor acquiring unit 121 (Step S101: YES), the relay destination selecting unit 123 selects a wireless device that is the relay destination of data (Step S102). On the other hand, when there is not the transmission data (Step S101: NO), the relay destination selecting unit 123 waits the notice from the sensor acquiring unit 121.

Then, the data transmitting unit 124 transmits data to the data collector that functions as AP and collects data (Step S103). Moreover, the data transmitting unit 124 adds relay-destination-device identification information of identifying a wireless device that is a relay destination to the same as data transmitted to the data collector and transmits the added data to the wireless device that is selected by the relay destination selecting unit 123 (Step S104). It should be noted that any process of Step S103 of transmitting data to the data collector and Step S104 of transmitting data to the wireless device that is a relay destination may be performed first.

Data Relay Process by Second Embodiment

Figure 7:
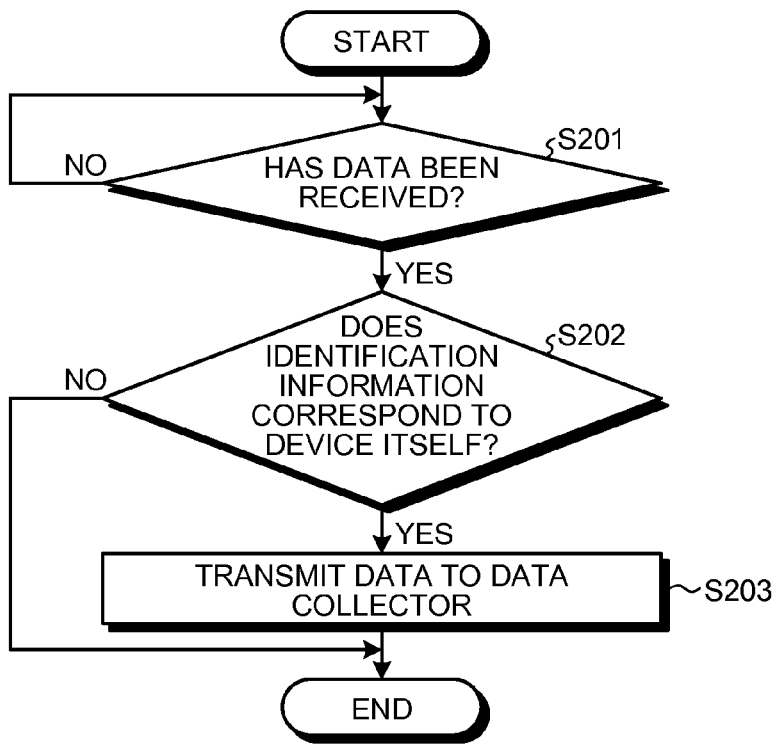
FIG. 7 is a flowchart explaining a flow of a data relay process according to the second embodiment.

Next, it will be explained about the flow of a data relay process according to the second embodiment with reference to FIG. 7. FIG. 7 is a flowchart explaining the flow of a data relay process according to the second embodiment. It should be noted that a data relay process mainly means a process that is performed by the data relaying unit 125.

For example, as illustrated in FIG. 7, when it is notified that data is received by the wireless communication processing unit 122 (Step S201: YES), the data relaying unit 125 determines whether the wireless device 100 corresponds to the relay-destination-device identification information included in the received data (Step S202). When the data is not received (Step S201: NO), the data relaying unit 125 waits the reception of data.

Then, when the wireless device 100 corresponds to the relay-destination-device identification information (Step S202: YES), the data relaying unit 125 transmits the data to the data collector (Step S203). On the other hand, when the wireless device 100 does not correspond to the relay-destination-device identification information (Step S202: NO), the data relaying unit 125 terminates the process.

Wireless Communication Process by Second Embodiment

Figure 8:
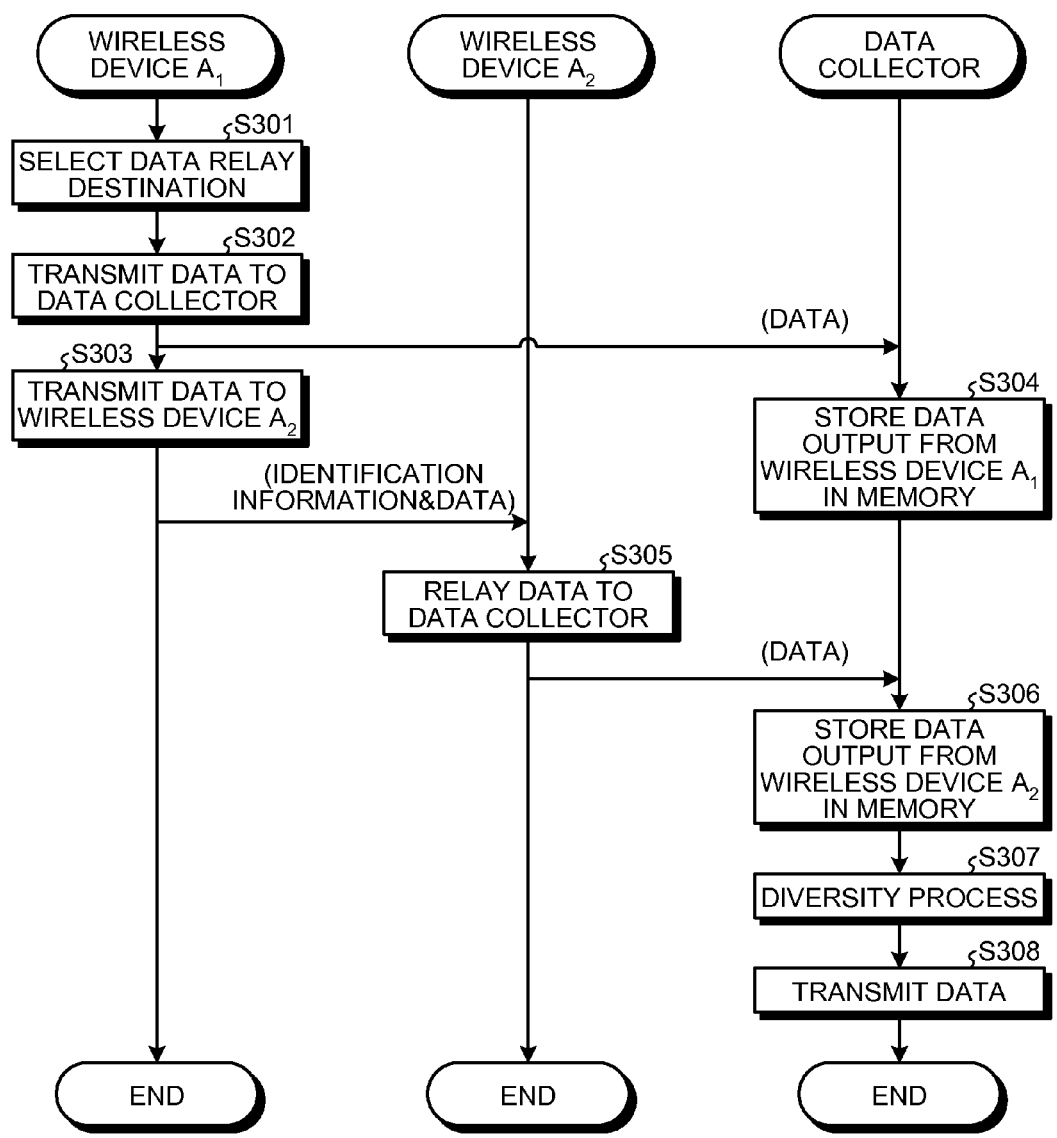
FIG. 8 is a process sequence diagram explaining a flow of a wireless communication process according to the second embodiment.

Next, it will be explained about the flow of a wireless communication process according to the second embodiment with reference to FIG. 8. FIG. 8 is a process sequence diagram explaining the flow of a wireless communication process according to the second embodiment. A wireless communication process mainly means a process that is performed by the wireless device 100 and the data collector 150. Hereinafter, it will be explained about an example of using the wireless device $A_1$ and the wireless device $A_2$ among the plurality of wireless devices and of transmitting sensing data from the wireless device $A_1$.

For example, as illustrated in FIG. 8, the wireless device $A_1$ selects the wireless device $A_2$ as a wireless device that is the relay destination of data (Step S301). Then, the wireless device $A_1$ transmits data to the data collector that functions as AP and collects data (Step S302). Next, the wireless device $A_1$ adds relay-destination-device identification information of identifying the wireless device $A_2$ that is the relay destination of data to the same as data transmitted to the data collector and transmits the added data to the wireless device $A_2$ (Step S303). Moreover, the data collector receives the data transmitted from the wireless device $A_1$, and then stores the received data in a predetermined memory (Step S304).

On the other hand, the wireless device $A_2$ receives the data transmitted from the wireless device $A_1$, and transmits (relays) the data to the data collector when the device itself corresponds to the relay-destination-device identification information included in the data (Step S305). Moreover, the data collector receives the data transmitted from the wireless device $A_2$, and stores the received data in the predetermined memory (Step S306).

Then, the data collector performs a diversity process on the data transmitted from the wireless device $A_1$ and the wireless device $A_2$ (Step S307) and transmits the processed data to the external network (Step S308).

Effect by Second Embodiment

As described above, the wireless device transmits the same data to the other wireless device and the data collector, and the data is transmitted to the data collector by the other wireless device. As a result, the wireless device establishes communication having two or more routes for the same data, and thus communication reliability can be secured.

[c] Third Embodiment

However, in the first or second embodiment, it has been explained about the case where data is transmitted to the data collector when the device itself corresponds to relay-destination-device identification information. Hereinafter, it will be explained about the case where data is transmitted to the data collector when the device itself corresponds to relay-destination-device identification information and the radio field intensity of the device is high in view of the data collector.

Network Configuration by Third Embodiment

Figure 9:
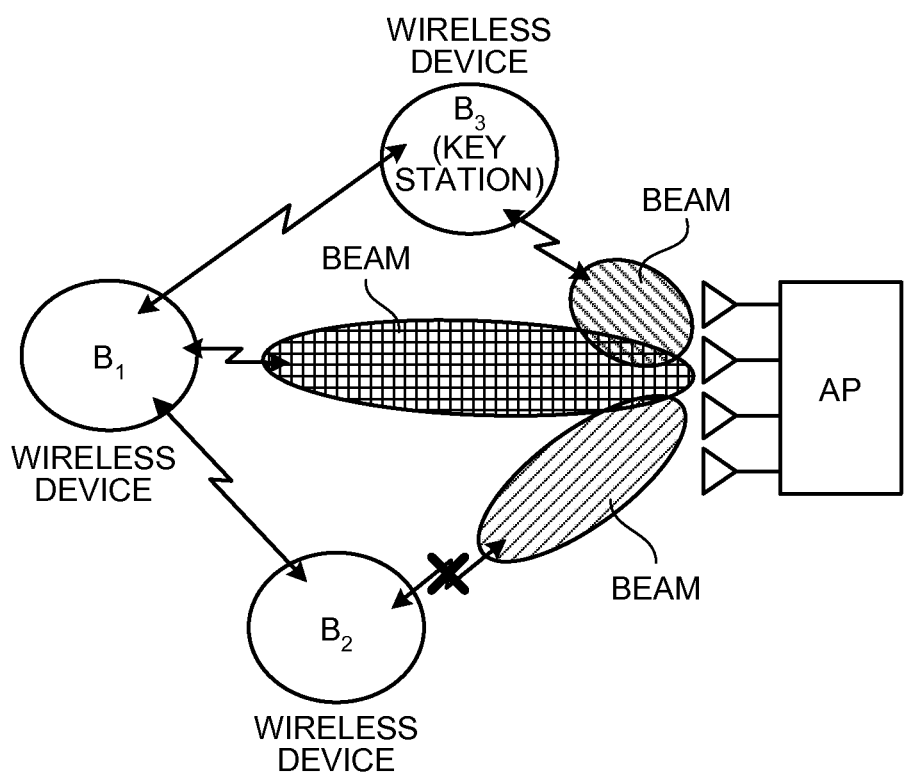
FIG. 9 is a diagram illustrating a network configuration example including a wireless device according to a third embodiment.

First, it will be explained about a network configuration example including a wireless device according to the third embodiment with reference to FIG. 9. FIG. 9 is a diagram illustrating a network configuration example including a wireless device according to the third embodiment.

For example, as illustrated in FIG. 9, a network including wireless devices includes a wireless device $B_1$, a wireless device $B_2$, a wireless device $B_3$, and a data collector that functions as AP. The wireless devices $B_1$ to $B_3$ can wirelessly communicate with, for example, AP and can wirelessly communicate with each other in an ad-hoc communication method.

On the other hand, the AP performs, for example, beam forming for turning the direction of the antenna to an arbitrary communication area, and communicates with the wireless devices $B_1$ to $B_3$. Moreover, the AP previously decides, for example, a wireless device (for example, "wireless device $B_3$") of which the communication state with the AP is the best as a key station on the basis of RSS such as a beacon signal, and informs the wireless device $B_3$ of the effect that the device $B_3$ is a key station. In regard to the decision of a key station, a communication state with a wireless device in the communication area of AP is detected on a timely basis, and thus the key station is replaced. Hereinafter, it will be explained about an example of transmitting data from the wireless device $B_1$ by using the wireless device $B_3$ as a key station.

For example, when data acquired by a sensor is transmitted, the wireless device $B_1$ selects the wireless device $B_2$ and the wireless device $B_3$ as a wireless device that is the relay destination of data. A wireless device that is the relay destination of data is selected, for example, by using a beacon signal output from each wireless device and by searching wireless devices that have mutually high radio field intensity in the vicinity.

The wireless device $B_1$ transmits data to AP and transmits the same as data transmitted to the AP to the wireless device $B_2$ and the wireless device $B_3$ that are selected as the relay destination of data. Moreover, when data is transmitted to the wireless device $B_2$ and the wireless device $B_3$, the wireless device $B_1$ transmits data that is obtained by adding self-device identification information of identifying the wireless device $B_1$ and relay-destination-device identification information of identifying the wireless device $B_2$ or the wireless device $B_3$. The transmission of data performed by the wireless device B1 is performed in a time sharing manner.

On the other hand, the wireless device $B_3$ receives data obtained by adding relay-destination-device identification information from the wireless device $B_1$, and transmits (relays) the received data to the AP when the device itself corresponds to the relay-destination-device identification information and the device itself is a key station. At this time, the wireless device $B_2$ does not transmit the data received from the wireless device $B_1$ to the AP because the device itself is not a key station. After that, the AP receives the data transmitted from the wireless device $B_1$ and the wireless device $B_3$, and then performs a diversity process on the received data to transmit the data to a predetermined external network.

Wireless Device Configuration by Third Embodiment

Figure 10:
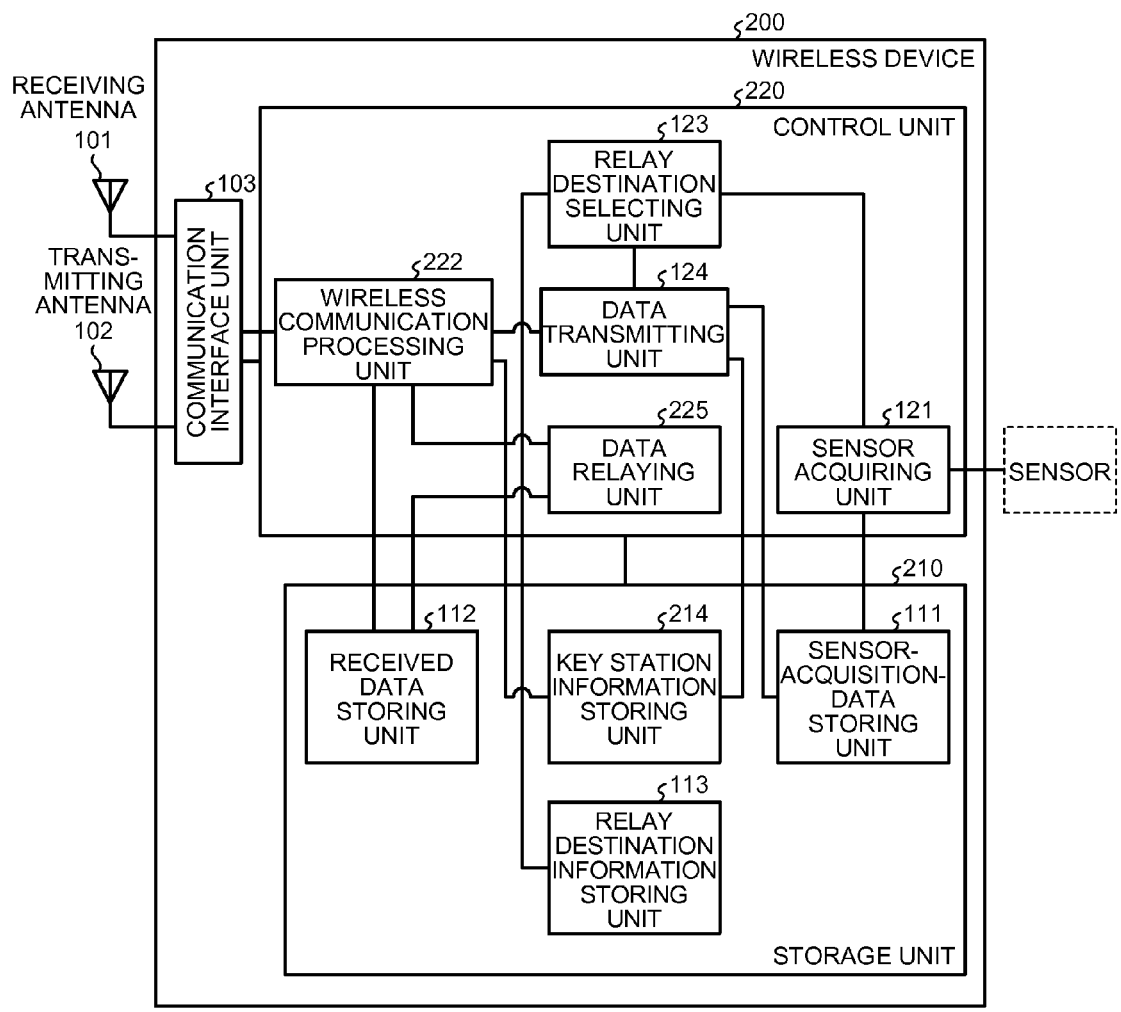
FIG. 10 is a diagram illustrating an example configuration of the wireless device according to the third embodiment.

Next, it will be explained about an example configuration of a wireless device according to the third embodiment with reference to FIG. 10. FIG. 10 is a diagram illustrating an example configuration of a wireless device 200 according to the third embodiment. In FIG. 10, the same components as those of the wireless device 100 according to the second embodiment have the same reference numbers. Hereinafter, their descriptions are omitted about the same processes as those of the wireless device 100 according to the second embodiment.

For example, as illustrated in FIG. 10, the wireless device 200 includes the receiving antenna 101, the transmitting antenna 102, the communication interface unit 103, a storage unit 210, and a control unit 220.

The storage unit 210 stores data required for various types of processes performed by the control unit 220 and various types of processing results performed by the control unit 220. The storage unit 210 includes the sensor-acquisition-data storing unit 111, the received data storing unit 112, the relay destination information storing unit 113, and a key station information storing unit 214. Moreover, the storage unit 210 is, for example, a semiconductor memory device such as RAM (Random Access Memory), ROM (Read Only Memory), or a flash memory, or is a storage device such as a hard disk or an optical disc. The functions of the sensor-acquisition-data storing unit 111, the received data storing unit 112, and the relay destination information storing unit 113 are the same as those of the second embodiment described above.

The key station information storing unit 214 stores, for example, data processed by a wireless communication processing unit 222. The data stored in the key station information storing unit 214 is, for example, information representing that it is a key station transmitted from the data collector that functions as AP. In addition, because another process performed by the wireless communication processing unit 222 is similar to that of the second embodiment, its description is omitted.

The control unit 220 includes an internal memory that stores a control program, a program that defines various types of processing procedures, and required data, and controls the wireless device 200. Moreover, the control unit 220 further includes the sensor acquiring unit 121, the wireless communication processing unit 222, the relay destination selecting unit 123, the data transmitting unit 124, and a data relaying unit 225. In this case, the control unit 220 is, for example, an integrated circuit such as ASIC (Application Specific Integrated Circuit) or FPGA (Field Programmable Gate Array), or an electronic circuit such as CPU (Central Processing Unit) or MPU (Micro Processing Unit). The functions of the sensor acquiring unit 121, the relay destination selecting unit 123, and the data transmitting unit 124 are the same as those of the second embodiment described above.

When it is notified that data is received by the wireless communication processing unit 222, the data relaying unit 225 acquires, for example, data from the received data storing unit 112. Then, when the wireless device 200 corresponds to the relay-destination-device identification information included in the data acquired from the received data storing unit 112, the data relaying unit 225 acquires data from the key station information storing unit 214.

Next, when the wireless device 200 is a key station on the basis of key station information included in the data acquired from the key station information storing unit 214, the data relaying unit 225 transmits the acquired data to the data collector. On the other hand, when the wireless device 200 does not correspond to the relay-destination-device identification information or when the wireless device 200 is not a key station, the data relaying unit 225 terminates the process without relaying data. Moreover, any of the determination of relay-destination-device identification information performed by the data relaying unit 225 and the determination of a key station may be performed first.

Data Relay Process by Third Embodiment

Figure 11:
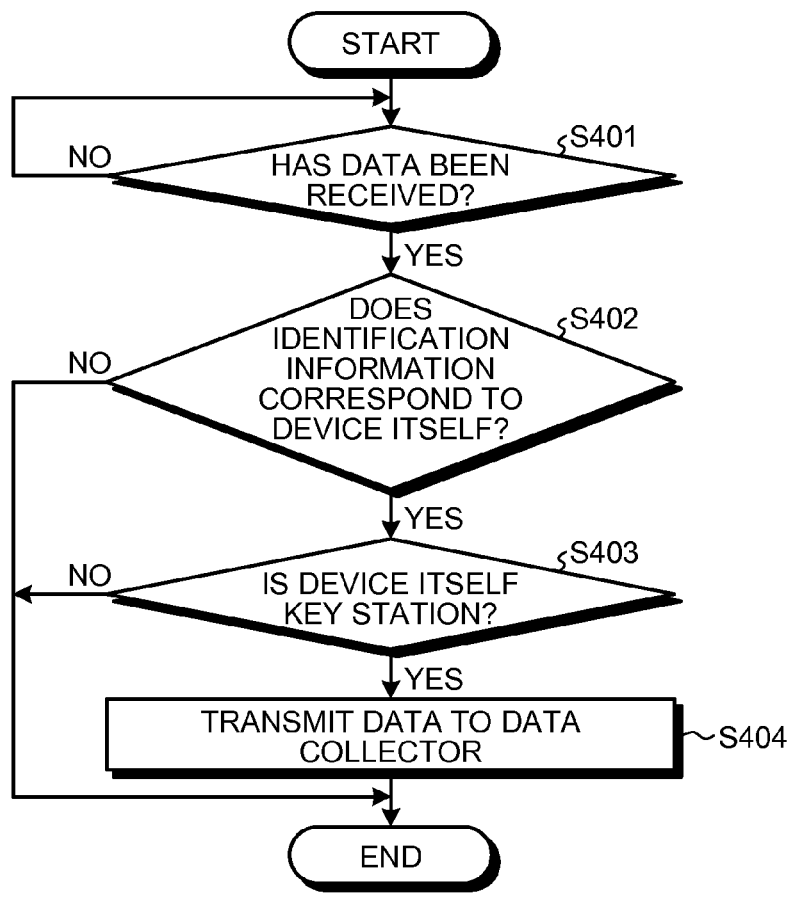
FIG. 11 is a flowchart explaining a flow of a data relay process according to the third embodiment.

Next, it will be explained about the flow of a data relay process according to the third embodiment with reference to FIG. 11. FIG. 11 is a flowchart explaining the flow of a data relay process according to the third embodiment. It should be noted that a data relay process mainly means a process that is performed by the data relaying unit 225.

For example, as illustrated in FIG. 11, when it is notified that data is received by the wireless communication processing unit 222 (Step S401: YES), the data relaying unit 225 determines whether the wireless device 200 corresponds to the relay-destination-device identification information included in the received data (Step S402). On the other hand, when data is not received (Step S401: NO), the data relaying unit 225 waits the reception of data.

Then, when the wireless device 200 corresponds to the relay-destination-device identification information (Step S402: YES), the data relaying unit 225 determines whether the wireless device 200 is a key station (Step S403). Next, when the wireless device 200 is a key station (Step S403: YES), the data relaying unit 225 transmits data to the data collector (Step S404). On the other hand, when the wireless device 200 does not correspond to the relay-destination-device identification information (Step S402: NO) or when it is determined that the wireless device 200 is not a key station (Step S403: NO), the data relaying unit 225 terminates the process without transmitting data to the data collector. Moreover, any of Step S402 of determining whether identification information corresponds to the device itself and Step S403 of determining whether the device itself is a key station may be performed first.

Effect by Third Embodiment

As described above, because a wireless device transmits data of a good communication state to the data collector, communication reliability can be secured and radio wave interference in a network including a wireless device and electric power of each wireless device can be suppressed.

[d] Fourth Embodiment

However, in the second and third embodiments, it has been explained about the case where a wireless device can directly communicate with a data collector. Even if the wireless device cannot directly communicate with the data collector, data can be transmitted through a plurality of routes. Therefore, it will be below explained about the case where a wireless device cannot directly communicate with a data collector.

Network Configuration by Fourth Embodiment

Figure 12:
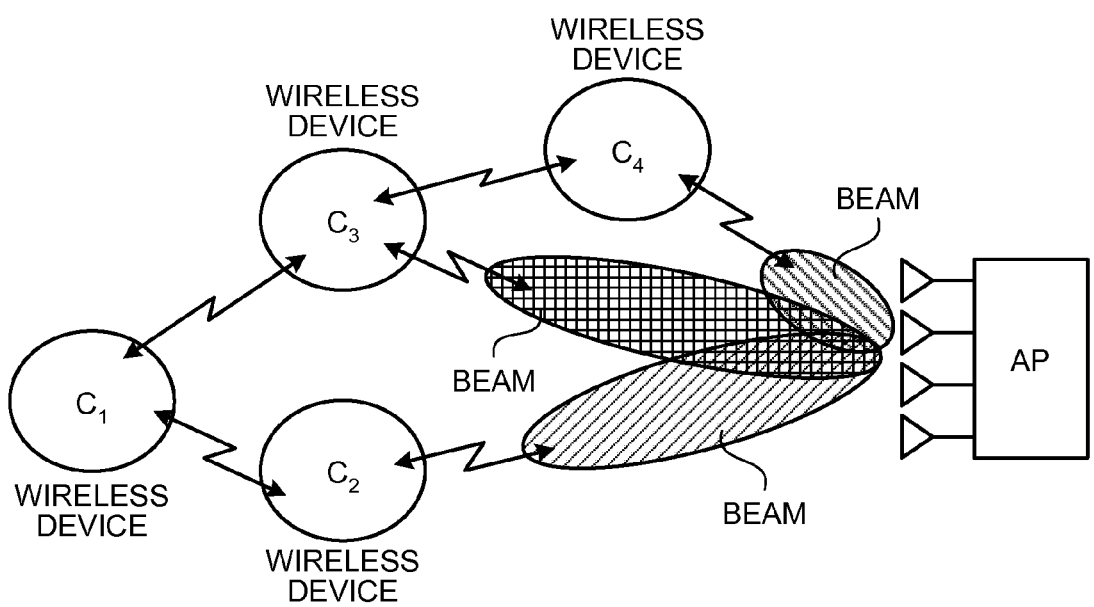
FIG. 12 is a diagram illustrating a network configuration example including a wireless device according to a fourth embodiment.

First, it will be explained about a network configuration example including a wireless device according to the fourth embodiment with reference to FIG. 12. FIG. 12 is a diagram illustrating a network configuration example including a wireless device according to the fourth embodiment.

For example, as illustrated in FIG. 12, a network including wireless devices includes a wireless device $C_1$, a wireless device $C_2$, a wireless device $C_3$, a wireless device $C_4$, and a data collector that functions as AP. For example, the wireless device $C_2$, the wireless device $C_3$, and the wireless device $C_4$ can wirelessly communicate with the AP and can wirelessly communicate with each other in an ad-hoc communication method.

Moreover, for example, the wireless device $C_1$ cannot wirelessly communicate with AP and can wirelessly communicate with the wireless device $C_2$ and the wireless device $C_3$ mutually. The fact that the wireless device $C_1$ cannot wirelessly communicate with the AP is previously recognized by using a beacon signal sent from the wireless device. On the other hand, the AP performs, for example, beam forming for turning the direction of the antenna to an arbitrary communication area, and communicates with the wireless devices $C_2$ to $C_4$. Hereinafter, it will be explained about an example of transmitting data from the wireless device $C_1$.

For example, when data acquired by a sensor is transmitted, the wireless device $C_1$ selects a plurality of wireless devices of the wireless device $C_2$ and the wireless device $C_3$ as a wireless device that is the relay destination of the data. A wireless device that is the relay destination of data is selected, for example, by using a beacon signal output from each wireless device and by searching wireless devices having mutually high radio field intensity in the vicinity.

Then, the wireless device $C_1$ transmits the same data to the wireless device $C_2$ and the wireless device $C_3$ that are selected as the relay destination of data. Moreover, when data is transmitted to the wireless device $C_2$, the wireless device $C_1$ transmits data that is obtained by adding self-device identification information of identifying the wireless device $C_1$ and relay-destination-device identification information of identifying the wireless device $C_2$. Similarly, when data is transmitted to the wireless device $C_3$, the wireless device $C_1$ transmits data that is obtained by adding self-device identification information of identifying the wireless device $C_1$ and relay-destination-device identification information of identifying the wireless device $C_3$. It should be noted that the transmission of data performed by the wireless device $C_1$ is performed in a time sharing manner.

On the other hand, the wireless device $C_2$ receives data obtained by adding relay-destination-device identification information from the wireless device $C_1$, and transmits (relays) the received data to the AP when the device itself corresponds to the relay-destination-device identification information. Moreover, the wireless device $C_3$ receives data obtained by adding relay-destination-device identification information from the wireless device $C_1$, and transmits (relays) the received data to the AP when the device itself corresponds to the relay-destination-device identification information. Furthermore, the wireless device $C_3$ transmits the same data obtained by adding relay-destination-device identification information, by which the wireless device $C_4$ becomes a relay destination, to the wireless device $C_4$.

The wireless device $C_4$ then receives data obtained by adding relay-destination-device identification information from the wireless device $C_3$, and transmits (relays) the received data to the AP when the device corresponds to the relay-destination-device identification information. After that, the AP receives data transmitted from the wireless device $C_2$, the wireless device $C_3$, and the wireless device $C_4$, and then performs the selection of data output from the wireless device having high radio field intensity or the synthesis process of the received data and transmits the data to a predetermined external network.

Wireless Device Configuration by Fourth Embodiment

Figure 13:
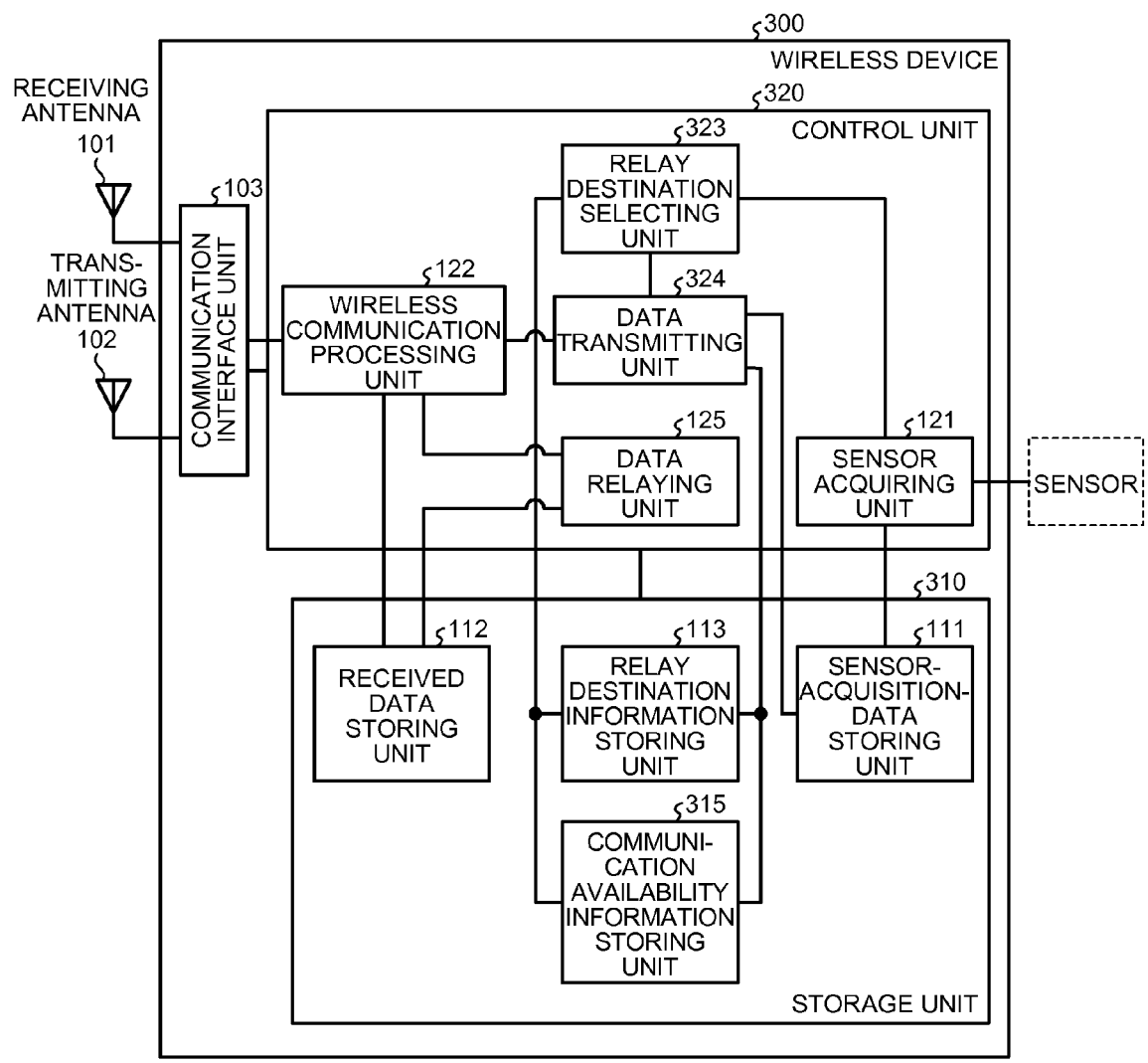
FIG. 13 is a diagram illustrating an example configuration of the wireless device according to the fourth embodiment.

Next, it will be explained about an example configuration of a wireless device according to the fourth embodiment with reference to FIG. 13. FIG. 13 is a diagram illustrating an example configuration of a wireless device 300 according to the fourth embodiment. In FIG. 13, the same components as those of the wireless device 100 according to the second embodiment have the same reference numbers. Hereinafter, their descriptions are omitted about the same processes as those of the wireless device 100 according to the second embodiment.

For example, as illustrated in FIG. 13, the wireless device 300 includes the receiving antenna 101, the transmitting antenna 102, the communication interface unit 103, a storage unit 310, and a control unit 320.

The storage unit 310 stores, data required for various types of processes performed by the control unit 320 and various types of processing results performed by the control unit 320. The storage unit 310 includes the sensor-acquisition-data storing unit 111, the received data storing unit 112, the relay destination information storing unit 113, and a communication availability information storing unit 315. Moreover, the storage unit 310 is, for example, a semiconductor memory device such as RAM (Random Access Memory), ROM (Read Only Memory), or a flash memory, or is a storage device such as a hard disk or an optical disc. In this case, the functions of the sensor-acquisition-data storing unit 111, the received data storing unit 112, and the relay destination information storing unit 113 are the same as those of the second embodiment described above.

The communication availability information storing unit 315 stores, for example, data processed by a relay destination selecting unit 323 to be described below. The data stored in the communication availability information storing unit 315 is, for example, a communication state with the data collector, which is obtained from a beacon signal sent by the relay destination selecting unit 323, and is information indicating whether the wireless device 300 and the data collector can communicate with each other.

The control unit 320 includes an internal memory that stores a control program, a program that defines various types of processing procedures, and required data, and controls the wireless device 300. Moreover, the control unit 320 further includes the sensor acquiring unit 121, the wireless communication processing unit 122, the relay destination selecting unit 323, a data transmitting unit 324, and the data relaying unit 125. The control unit 320 is, for example, an integrated circuit such as ASIC (Application Specific Integrated Circuit) or FPGA (Field Programmable Gate Array), or is an electronic circuit such as CPU (Central Processing Unit) or MPU (Micro Processing Unit). In this case, the functions of the sensor acquiring unit 121, the wireless communication processing unit 122, and the data relaying unit 125 are the same as those of the second embodiment described above.

The relay destination selecting unit 323 sends, for example, a beacon signal or the like, and stores information indicating whether the wireless device 300 and the data collector can communicate with each other in the communication availability information storing unit 315. Moreover, when it is notified that data is acquired by the sensor acquiring unit 121 and the wireless device 300 and the data collector can communicate with each other, the relay destination selecting unit 323 selects at least one wireless device that is the relay destination of data. On the other hand, when it is notified that data is acquired by the sensor acquiring unit 121 and the wireless device 300 and the data collector cannot communicate with each other, the relay destination selecting unit 323 selects a plurality of wireless devices that is the relay destination of data.

A wireless device that is the relay destination of data is selected, for example, by using a beacon signal output from each wireless device and by searching wireless devices of which the radio field intensities with the wireless device 300 are not less than a predetermined value. Moreover, the number of the selected wireless devices that are a relay destination may be multiple if radio field intensity with the wireless device 300 is not less than the predetermined value. The relay destination selecting unit 323 then stores relay-destination-device identification information of identifying the selected wireless device that is a relay destination in the relay destination information storing unit 113. After that, the relay destination selecting unit 323 informs the data transmitting unit 324 of the selection of the wireless device that is a relay destination.

When it is notified that the wireless device that is a relay destination is selected by the relay destination selecting unit 323, the data transmitting unit 324 acquires, for example, communication availability information between the wireless device 300 and the data collector from the communication availability information storing unit 315. Then, when the wireless device 300 and the data collector can communicate with each other, the data transmitting unit 324 acquires data from the sensor-acquisition-data storing unit 111 and transmits the acquired data to the data collector. Next, the data transmitting unit 324 acquires relay-destination-device identification information from the relay destination information storing unit 113, and transmits data, which is obtained by adding self-device identification information of identifying the wireless device 300 and the acquired relay-destination-device identification information to the data acquired from the sensor-acquisition-data storing unit 111, to the wireless device that is a relay destination.

Moreover, when the wireless device 300 and the data collector cannot communicate with each other, the data transmitting unit 324 acquires a plurality of relay-destination-device identification information from the relay destination information storing unit 113. Then, the data transmitting unit 324 adds the self-device identification information of identifying the wireless device 300 and the acquired relay-destination-device identification information to the data acquired from the sensor-acquisition-data storing unit 111, and transmits the same added data to each of the wireless devices that are a relay destination. In addition, when the wireless device 300 and the data collector cannot communicate with each other, the data transmitting unit 324 does not transmit data to the data collector.

Data Transmission Process by Fourth Embodiment

Figure 14:
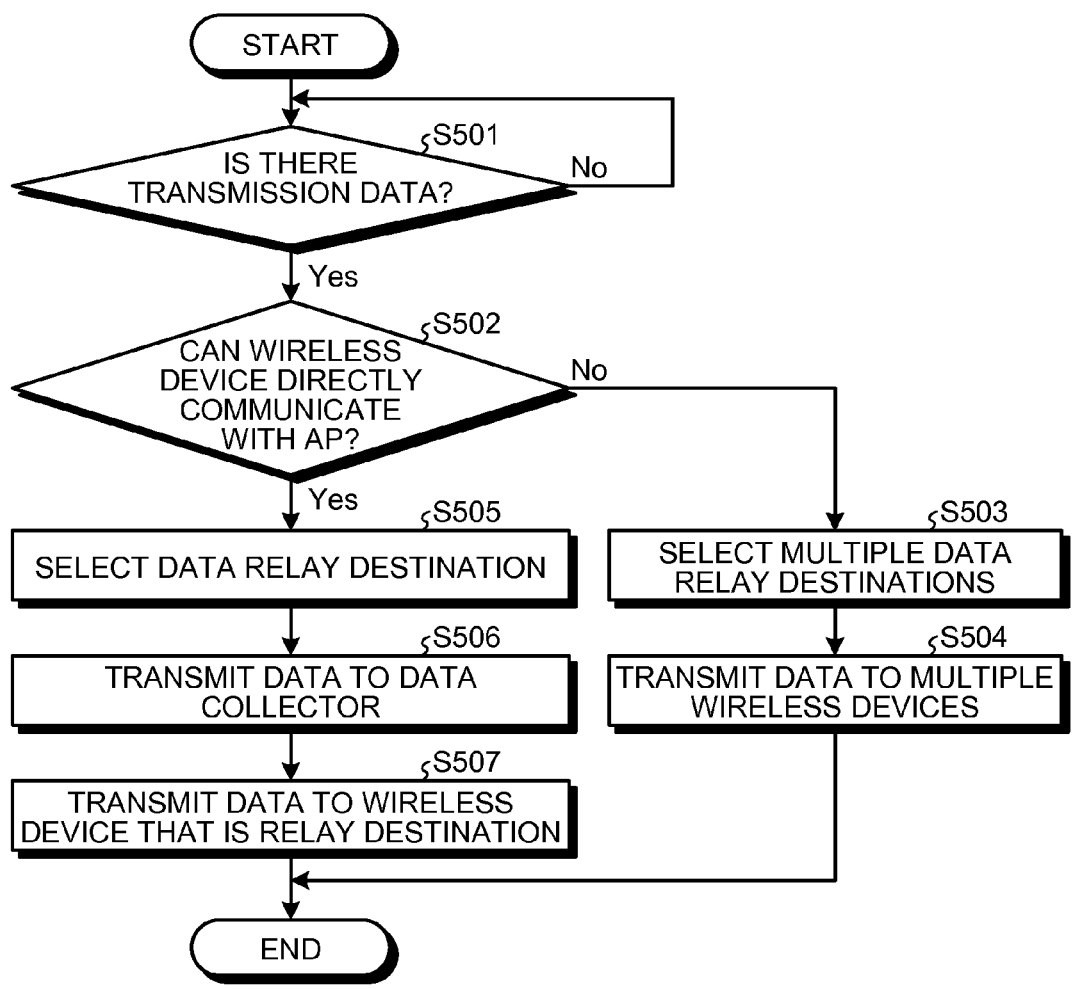
FIG. 14 is a flowchart explaining a flow of a data transmission process according to the fourth embodiment.

Next, it will be explained about the flow of a data transmission process according to the fourth embodiment with reference to FIG. 14. FIG. 14 is a flowchart explaining the flow of a data transmission process according to the fourth embodiment. In this case, a data transmission process mainly means a process performed by the relay destination selecting unit 323 and the data transmitting unit 324.

For example, as illustrated in FIG. 14, when there is transmission data in accordance with the acquisition notice of sensing data from the sensor acquiring unit 121 (Step S501: YES), the relay destination selecting unit 323 determines whether the wireless device 300 and the data collector (AP) can communicate with each other by using a beacon signal or the like (Step S502). On the other hand, when there is not the transmission data (Step S501: NO), the relay destination selecting unit 323 waits the notice by the sensor acquiring unit 121.

Then, when the wireless device 300 and the data collector cannot communicate with each other (Step S502: NO), the relay destination selecting unit 323 selects a plurality of wireless devices that is the relay destination of data (Step S503). Next, the data transmitting unit 324 transmits the same data obtained by adding relay-destination-device identification information of identifying the wireless device that is a relay destination to the wireless devices that are selected by the relay destination selecting unit 323 (Step S504).

Moreover, when the wireless device 300 and the data collector can communicate with each other (Step S502: YES), the relay destination selecting unit 323 selects at least one wireless device that is the relay destination of data (Step S505). Then, the data transmitting unit 324 transmits data to the data collector that functions as AP and collects data (Step S506). Additionally, the data transmitting unit 324 transmits data, which is obtained by adding relay-destination-device identification information of identifying the wireless device that is a relay destination to the same as data transmitted to the data collector, to the wireless device that is selected by the relay destination selecting unit 323 (Step S507). It should be noted that any of Step S506 of transmitting data to the data collector and Step S507 of transmitting data to the wireless device that is a relay destination may be performed first.

Effect by Fourth Embodiment

As described above, even if a wireless device cannot directly communicate with a data collector, communication reliability can be secured by establishing multiple-route communication for the same data.

[e] Fifth Embodiment

It has been explained about the embodiments of the wireless device, the wireless communication system, and the wireless communication method disclosed in the present application till now. The present application may be realized by various different configurations in addition to the embodiments described above. Therefore, it will be explained about another embodiment in regard to (1) data relay and (2) configuration of each device.

(1) Data Relay

In the embodiments, it has been explained about the case where a wireless device that is a transmission source transmits data obtained by adding self-device identification information and relay-destination-device identification information and a wireless device that relays data transmits the data to a data collector. The wireless device that relays data may further add information indicative of the relay of data to the data.

For example, when receiving data from another wireless device, the wireless device that relays data transmits data, which is obtained by adding information indicating that the device itself relays the data, to the data collector or/and other wireless device. As a result, when data cannot be relayed by some kind of factor at the time of data relay, the wireless device specifies data to be transmitted again by using information indicating that data is relayed and transmits the specified data.

(2) Configuration of Each Device

Processing procedures, control procedures, concrete titles, and information including various types of data and parameters (for example, a format of data to be transmitted and concrete titles of the reception wait circuit 163, the transmission wait circuit 173, and the like), which are described in the document and the drawings, can be arbitrarily changed except that they are specially mentioned.

Moreover, each component of the wireless device and the data collector illustrated in the drawings is a functional concept. Therefore, these components are not necessarily constituted physically as illustrated in the drawings. In other words, the specific configuration of dispersion/integration of each device is not limited to the illustrated configuration. Therefore, all or a part of each device can dispersed or integrated functionally or physically in an optional unit in accordance with various types of loads or operating conditions. For example, the data transmitting unit 124 and the data relaying unit 125 may be integrated as a "data processing unit" that transmits data to the data collector and the other wireless device and relays the received data to the data collector. Moreover, although the receiving antenna 101 and the transmitting antenna 102 are illustrated as separate antennas, these antennas may be integrated as a transmission/reception antenna. However, when these antennas are integrated as a transmission/reception antenna, the transmission/reception antenna requires a branching filter that divides transmission/reception frequency and sends the divided frequency to a communication interface unit (in the case of FDMA (Frequency Division Multiple Access)), a time division switch that corresponds to transmission/reception time (in the case of TDMA (Time Division Multiple Access)), and the like.

As described above, according to an aspect of the wireless device, the wireless communication system, and the wireless communication method disclosed in the present application, communication reliability can be secured.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless device comprising:
 a relay destination selecting unit that selects a first wireless device other than the wireless device as a relay destination of data;
 a data transmitting unit that transmits first data to a data collector and transmits second data to the first wireless device, the transmitted second data containing the first data and relay-destination-device identification information for identifying the first wireless device, the data collector performing beam forming for collecting data; and a data relaying unit that receives a second data from a second wireless device other than the wireless device, the data relaying unit determining whether the wireless device corresponds to the relay destination device identification information included in the second data, the data relaying unit transmitting the received second data to the data collector when the data relaying unit determines the wireless device corresponds to the relay-destination-device identification information in the received second data indicates the wireless device.

2. The wireless device according to claim 1, wherein the first wireless device to be selected by the relay destination selecting unit has a radio field intensity not less than a predetermined value from the wireless device.

3. The wireless device according to claim 1, wherein the data relaying unit transmits the received second data to the data collector when radio field intensity between the wireless device and the data collector is more than radio field intensity between any other wireless device and the data collector.

4. The wireless device according to claim 1, wherein
the relay destination selecting unit selects a plurality of first wireless devices each being a relay destination of data, and
the data transmitting unit transmits as a second data, data containing the first data and relay-destination-device identification information for identifying the respective first wireless devices.

5. A wireless communication system, comprising:
a first wireless device other than the wireless device;
a second wireless device other than the wireless device; and
a data collector, wherein the first wireless device includes
a relay destination selecting unit that selects the second wireless device as a relay destination of data; and
a data transmitting unit that transmits first data to the data collector and transmits second data to the second wireless device, the transmitted second data containing the first data and relay-destination-device identification information for identifying the second wireless device, the data collector performing beam forming for collecting data,
the second wireless device includes a data relaying unit that receives a second data from the first wireless device, the data relaying unit determining whether the second wireless device corresponds to the relay destination device identification information included in the second data, and transmits the received second data to the data collector when the data relaying unit determines the second wireless device corresponds to the relay-destination-device identification information in the received second data indicates the second wireless device, and
the data collector includes a data receiving unit that receives the first data transmitted from the first wireless device and the second data transmitted from the second wireless device.

6. A wireless communication method, comprising
selecting, at a first wireless device other than the wireless device, a second wireless device other than the wireless device as a relay destination of data; and
transmitting, at the first wireless device, first data to a data collector;
transmitting, at the first wireless device, second data to the second wireless device, the second data containing the first data and relay-destination-device identification information for identifying the second wireless device, the data collector performing beam forming for collecting data;
receiving, at the second wireless device, a second data from the first wireless device;
determining whether the wireless device corresponds to the relay destination device identification information included in the second data;
transmitting, at the second wireless device, the received second data to the data collector when the determining determines the wireless device corresponds to the relay-destination-device identification information in the received second data indicates the second wireless device; and
receiving, at the data collector, the first data transmitted from the first wireless device and the received second data transmitted from the second wireless device.

7. The wireless device according to claim 1, wherein
the data collector previously decides a key station based on a communication state with the data collector among from wireless devices and informs decided wireless device that the decided wireless device is the key station, and
the data relaying unit transmits the received second data to the data collector when the wireless device is the key station informed by the data collector.

8. The wireless device according to claim 1, wherein
the data transmitting unit adds information indicating the wireless device that relays the data both to the first data and the second data.

* * * * *